United States Patent
Josopait

(10) Patent No.: US 10,459,702 B2
(45) Date of Patent: Oct. 29, 2019

(54) FLOW CONTROL FOR LANGUAGE-EMBEDDED PROGRAMMING IN GENERAL PURPOSE COMPUTING ON GRAPHICS PROCESSING UNITS

(71) Applicant: Ingo Josopait, Hannover (DE)

(72) Inventor: Ingo Josopait, Hannover (DE)

( * ) Notice: Subject to any disclaimer, the term of this patent is extended or adjusted under 35 U.S.C. 154(b) by 0 days.

(21) Appl. No.: 15/555,643

(22) PCT Filed: Mar. 3, 2016

(86) PCT No.: PCT/EP2016/054542
§ 371 (c)(1),
(2) Date: Sep. 5, 2017

(87) PCT Pub. No.: WO2016/139305
PCT Pub. Date: Sep. 9, 2016

(65) Prior Publication Data
US 2018/0046440 A1 Feb. 15, 2018

(30) Foreign Application Priority Data
Mar. 5, 2015 (EP) .................................... 15157809

(51) Int. Cl.
*G06F 8/30* (2018.01)
*G06F 8/41* (2018.01)
*G06F 9/448* (2018.01)

(52) U.S. Cl.
CPC ............. *G06F 8/423* (2013.01); *G06F 8/314* (2013.01); *G06F 8/433* (2013.01); *G06F 8/434* (2013.01); *G06F 9/4494* (2018.02)

(58) Field of Classification Search
CPC ................................................ G06F 8/41–437
See application file for complete search history.

(56) References Cited

U.S. PATENT DOCUMENTS 5,671,416 A * 9/1997 Elson .................... G06F 8/41
717/106
5,701,490 A * 12/1997 Safonov ................ G06F 8/427
717/143

(Continued)

FOREIGN PATENT DOCUMENTS

WO 2012097316 A1 7/2012

OTHER PUBLICATIONS

Thomas C. Jansen, GPU++ An Embedded GPU Development System for General-Purpose Computations , p. 1-128, [Retrieved online on Jun. 15, 2018 <http://mediatunn.ub.tum.de/doc/617693/921256.pdf>] (Year: 2007).*

(Continued)

*Primary Examiner* — Thuy Dao
*Assistant Examiner* — Zheng Wei
(74) *Attorney, Agent, or Firm* — LKGlobal | Lorenz & Kopf, LLP

(57) ABSTRACT

The present invention discloses a method of flow control in a computing device, for processing of flow control statements to adapt a data structure of a program running on the computing device and a computer program product storing the method. The invention thereby allows the integration of the kernels into the main program when compiling. The whole parsing of the CPU program parts and the kernels is done by 10 one single standard compiler. The actual compiler for the device can be linked as a library and does not need to do any parsing. The invention further allows loops and if-clauses to be used in language-embedded GPGPU programming, enabling full general-purpose programming of the device in a way that is fully embedded in an ordinary programming language. The device can be a highly parallel computing 15 device, such as a video card, or some other computing device.

13 Claims, 7 Drawing Sheets

(56) References Cited

U.S. PATENT DOCUMENTS

| | | | | |
|---|---|---|---|---|
| 5,915,255 A * | 6/1999 | Schwartz | G06F 12/0276 | |
| 6,014,518 A * | 1/2000 | Steensgaard | G06F 8/437 | 717/143 |
| 6,298,481 B1 * | 10/2001 | Kosaka | G06F 9/44521 | 717/110 |
| 6,832,378 B1 * | 12/2004 | Beatty, III | G06F 9/4843 | 718/101 |
| 7,146,606 B2 * | 12/2006 | Mitchell | 717/141 | |
| 7,370,321 B2 * | 5/2008 | Radigan | G06F 8/433 | 717/144 |
| 8,281,297 B2 * | 10/2012 | Dasu | G06F 8/433 | 717/161 |
| 8,866,827 B2 * | 10/2014 | Zhou | G06F 8/31 | 345/522 |
| 8,930,926 B2 * | 1/2015 | Bastoul | G06F 8/453 | 717/119 |
| 9,009,660 B1 * | 4/2015 | Griffin | G06F 9/48 | 717/119 |
| 9,152,427 B2 * | 10/2015 | Vorbach | G06F 8/443 | |
| 9,158,513 B2 * | 10/2015 | Girouard | G06F 8/41 | |
| 9,275,426 B2 * | 3/2016 | Hoeg | G06T 1/00 | |
| 9,477,477 B2 * | 10/2016 | Dally | G06F 8/437 | |
| 9,557,975 B2 * | 1/2017 | Angerer | G06F 8/433 | |
| 9,569,304 B2 * | 2/2017 | Girouard | G06F 8/41 | |
| 9,582,924 B2 * | 2/2017 | McNabb | G06T 15/08 | |
| 9,589,312 B2 * | 3/2017 | Poddar | G06T 1/60 | |
| 9,691,122 B2 * | 6/2017 | Bleiweiss | G06T 1/20 | |
| 9,697,300 B2 * | 7/2017 | Kummer | G06F 17/30958 | |
| 9,804,995 B2 * | 10/2017 | Bourd | G06F 15/17325 | |
| 9,805,498 B2 * | 10/2017 | Fu | G06T 15/06 | |
| 9,824,026 B2 * | 11/2017 | Dong | G06F 12/109 | |
| 9,830,133 B1 * | 11/2017 | Baskaran | G06F 8/41 | |
| 9,898,297 B2 * | 2/2018 | Vorbach | G06F 9/3836 | |
| 9,952,842 B2 * | 4/2018 | Lee | G06F 8/447 | |
| 2002/0100029 A1 * | 7/2002 | Bowen | G06F 8/41 | 717/140 |
| 2004/0268331 A1 * | 12/2004 | Mitchell | 717/146 | |
| 2008/0001953 A1 * | 1/2008 | Nagao | G06T 1/20 | 345/502 |
| 2008/0109795 A1 * | 5/2008 | Buck | G06F 8/443 | 717/137 |
| 2009/0187897 A1 * | 7/2009 | Asao | G06F 9/4492 | 717/154 |
| 2010/0218196 A1 * | 8/2010 | Leung | G06F 8/453 | 718/107 |
| 2011/0173224 A1 * | 7/2011 | Toledo | G06F 17/30489 | 707/769 |
| 2012/0185671 A1 * | 7/2012 | Bourd | G06F 15/17325 | 712/27 |
| 2012/0239706 A1 * | 9/2012 | Steinfadt | G06F 19/22 | 707/803 |
| 2013/0031536 A1 * | 1/2013 | De | G06F 8/427 | 717/146 |
| 2013/0055207 A1 * | 2/2013 | Cui | G06F 8/434 | 717/125 |
| 2013/0159982 A1 * | 6/2013 | Lerios | G06F 8/423 | 717/146 |
| 2015/0279092 A1 * | 10/2015 | Ganestam | G06T 17/005 | 345/419 |
| 2015/0309846 A1 * | 10/2015 | Prasad | G06F 9/546 | 345/522 |
| 2015/0339797 A1 * | 11/2015 | Lerios | G06F 8/423 | 345/522 |
| 2015/0379670 A1 * | 12/2015 | Koker | G06T 1/20 | 345/502 |
| 2015/0379762 A1 * | 12/2015 | Bleiweiss | G06T 1/20 | 345/625 |
| 2016/0042552 A1 * | 2/2016 | McNabb | G06T 15/08 | 345/424 |
| 2016/0055611 A1 * | 2/2016 | Manevitch | G06T 1/20 | 345/501 |
| 2016/0070246 A1 * | 3/2016 | Nakagawa | G05B 15/02 | 700/11 |
| 2016/0093012 A1 * | 3/2016 | Rao | G06T 1/20 | 345/522 |
| 2016/0093069 A1 * | 3/2016 | Maiyuran | G06T 1/20 | 345/505 |
| 2016/0180486 A1 * | 6/2016 | Rao | G06T 1/20 | 345/505 |
| 2016/0180488 A1 * | 6/2016 | Poddar | G06T 1/60 | 345/522 |
| 2016/0232702 A1 * | 8/2016 | Fu | G06T 1/20 | |
| 2016/0291942 A1 * | 10/2016 | Hutchison | G06F 8/451 | |
| 2016/0328333 A1 * | 11/2016 | Dong | G06F 12/02 | |
| 2017/0212791 A1 * | 7/2017 | Laskowski | G06F 9/5066 | |
| 2017/0236246 A1 * | 8/2017 | Mrozek | G06T 1/20 | 345/522 |
| 2017/0330371 A1 * | 11/2017 | Krol | G06T 15/40 | |

OTHER PUBLICATIONS

Bourgoin et al., Efficient Abstractions for GPGPU Programming, Published by Springer, Int J Parallel Prog (2014) 42:583-600, p. 583-600 (Year: 2014).*

Stromme et al., Chestnut: A GPU Programming Language for Non-Experts, published by ACM, PMAM '12 Feb. 26, 2012, p. 156-167, [Retrieved online Jun. 15, 2018 <https://dl.acm.org/citation.cfm?id=2141720>] (Year: 2012).*

Vinas et al., Improving OpenCL programmability with the Heterogeneous Programming Library, ICCS 2015 International Conference on Computational Science, published by Procedia Computer Science, vol. 51, 2015, pp. 110-119 (Year: 2015).*

Lee et al., GPU Kernels as Data-Parallel Array Computations in Haskell, Appeared in Workshop on Exploiting Parallelism using GPUs and other Hardware-Assisted Methods (EPHAM 2009), pp. 1-9 (Year: 2009).*

Catanzaro et al., Copperhead: Compiling an Embedded Data Parallel Language, published by ACM, pp. 47-56, PPoPP'11, Feb. 12-16, 2011 (Year: 2011).*

Mokhtari et al., BigKernel—High Performance CPU-GPU Communication Pipelining for Big Data-style Applications, published by IEEE computer society, 2014 IEEE 28th International Parallel & Distributed Processing Symposium, pp. 819-828 (Year: 2014).*

Hestness et al., GPU Computing Pipeline Inefficiencies and Optimization Opportunities in Heterogeneous CPU-GPU Processors, published by IEEE computer society, 2015 IEEE International Symposium on Workload Characterization, pp. 87-97 (Year: 2014).*

Mark Harris et al, GPU Gems 2, Chapter 31, GPU Flow-Control Idioms, Apr. 2005, XP055198276.

* cited by examiner

FLOW CONTROL FOR LANGUAGE-EMBEDDED PROGRAMMING IN GENERAL PURPOSE COMPUTING ON GRAPHICS PROCESSING UNITS

CROSS-REFERENCE TO RELATED APPLICATION

This application is a U.S. National-Stage entry under 35 U.S.C. § 371 based on International Application No. PCT/EP2016/054542, filed Mar. 3, 2016 which was published under PCT Article 21(2) and which claims priority to European Application No. 15157809.3, filed Mar. 5, 2015, which are all hereby incorporated in their entirety by reference.

TECHNICAL FIELD

This application pertains to data processing by means of general-purpose computing on graphics processing units. In particular, it relates to a novel technique called "language-embedded programming".

BACKGROUND

The term general-purpose computing on graphics processing units, GPGPU, is used for the use of specialized, highly parallel hardware, to do computationally demanding tasks that would normally be done on a normal processor. The hardware can be a video card or some other computing device. In most GPGPU programming environments, the main program, which can be run on a central processing unit, CPU, and the kernels running on the device for the computationally demanding tasks are parsed by separate compilers. The main program is parsed by an ordinary compiler and is written in an ordinary programming language, while the kernels are parsed by a dedicated compiler and are written in a specialized programming language.

A technique related to language embedded programming has first been described by Thomas C. Jansen in his doctoral thesis "GPU++—An Embedded GPU Development System for General-Purpose Computations", Technical University Munich, 2007. Therein methods of flow control, such as loops or if-clauses are not included. Therefore the disclosure is limited to a very small set of programs and does not enable general-purpose programming.

WO2012/097316 describes techniques for extending the architecture of a general-purpose graphics processing unit with parallel processing units to allow efficient processing of pipeline-based applications. The techniques include configuring local memory buffers connected to parallel processing units operating as stages of a processing pipeline to hold data for transfer between the parallel processing units.

Object-oriented programming languages allow the definition of new data types, along with corresponding operators. In language-embedded programming, special data types are defined in such a way that instead of doing the actual computation, the steps of computation are recorded and used to generate the machine code for the device. In this way, the kernels are fully integrated into the main program and don't have to be parsed by a special compiler.

These special data types are used to represent values that reside on the device. These values will typically be stored in registers. In one example, the type names for the device values are the intrinsic type names prefixed by the expression "gpu_", i.e., int becomes gpu_int, float becomes gpu_float, etc. Other naming conventions are possible as well. The kernels can be accessed as functions that use these special data types. When such a kernel function is executed on the CPU, the use of the device data types will create an expression graph, in which the steps of computation are represented. Each device variable holds a pointer to a node in the expression graph that determines how its value is computed. From this expression graph the kernel code is generated.

With the teachings of the prior art, the kernel cannot be integrated into the main program, unless two separate compilers are used.

In addition, other objects, desirable features and characteristics will become apparent from the subsequent summary and detailed description, and the appended claims, taken in conjunction with the accompanying drawings and this background.

SUMMARY

The present invention overcomes the drawbacks of the prior art and as such allows the integration of the kernels into the main program. The whole parsing of the CPU program parts and the kernels is done by one single standard compiler. The actual compiler for the device can be linked as a library and does not need to do any parsing.

The invention further allows loops and if-clauses to be used in language-embedded GPGPU programming, enabling full general-purpose programming of the device in a way that is fully embedded in an ordinary programming language. The device can be a highly parallel computing device, such as a video card, or some other computing device The above mentioned objectives are achieved by a method of flow control in a computing device, for processing of flow control statements to adapt a data structure of a program running on the computing device according to claim 1 and a computer program product according to claim 14. Further advantageous features are defined in the dependent claims.

BRIEF DESCRIPTION OF DRAWINGS

The present invention will hereinafter be described in conjunction with the following drawing figures, wherein like numerals denote like elements, and.

DETAILED DESCRIPTION

Figure 1:
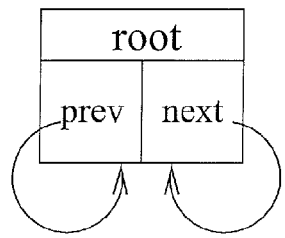
FIG. 1 is a diagram of an empty variable list

The following detailed description is merely exemplary in nature and is not intended to limit the invention or the application and uses of the invention. Furthermore, there is no intention to be bound by any theory presented in the preceding background of the invention or the following detailed description.

The invention allows flow control statements, such as loops and if-clauses, to be used in language-embedded programming.

There are different kinds of flow control statements. The most common are if-clauses, while-loops and for-loops. This invention applies to all three of them, but the general principles of this invention can also be applied to other kinds of flow control statements.

Of the three flow control statements listed above, if-clauses are the most basic ones. Loops have some additional requirements.

In while-loops, the loop condition is modified inside the loop body. Therefore, special care has to be taken. One way to solve this is to instantiate the loop condition as a Boolean outside the loop.

For example,

```
while (x <10)
{
  ...
}
``` can be implemented as

```
gpu_bool do_continue = (x <10);
gpu_while ( do_continue )
{
  ...
  do_continue = (x <10);
}
```

For-loops can always be expressed as while-loops, by declaring the loop variable before the loop and by incrementing it in the loop body.

To make the programming more user-friendly, it is advisable to mimic traditional loop syntax. According to the present invention, however, functions are required to be called at the beginning and at the end of the loop body. Instead of writing

```
gpu_if (x >0)
{
  // do something ...
}
``` something like the following needs to be written:

```
{
  gpu_if_begin (x >0);
  // do something ...
  gpu_if_end ( );
}
```

In order to achieve the former syntax, language features can be used. In C++, for instance, this can be achieved with the use of macros, for-loops, and constructors/destructors.

The 'continue' statement for skipping the rest of the loop body and continuing with the next loop cycle can be implemented as an if-clause that covers the rest of the loop body, or as multiple if-clauses in case the continue statement is in a sub-clause.

As an example the following loop is considered:

```
gpu_while (a != 0)
{
  gpu_if (b)
  {
    gpu_if (c)
    {
      gpu_continue ( );
    }
    // ... do something ...
  }
  // ... do something ...
}
```

The gpu_continue( ) statement may be implementing by transforming the loop into the following program, preferably transformed by the compiler library:

```
gpu_while (a != 0)
{
  gpu_bool noskip = true;
  gpu_if (b)
  {
    gpu_if (c)
    {
      noskip = false;
    }
    gpu_if ( noskip)
    {
      // ... do something ...
    }
  }
  gpu_if ( noskip)
  {
    // ... do something ...
  }
}
```

The 'break' statement for exiting a loop can be implemented like the 'continue' statement, but where the loop condition is modified as well, so that the loop is exited.

As an example regarding the underlying techniques of the invention, the following program is an example:

```
int example_program ( )
{
  int a =0;
  int b =1;
  while (b < 10)
  {
    a = a + b;
    b = b + 2;
  }
  return a;
}
```

In the example program, b serves as a loop variable, running over all odd natural numbers smaller than 10. Variable a will add up these numbers, and the result is returned. To execute it on the device, the program is modified as follows:

```
void example_kernel ( resource <int >& res)
{
  gpu_int a =0;
  gpu_int b =1;
  gpu_bool do_continue = (b < 10);
  gpu_while_begin ( do_continue );
  {
```

```
        a = a + b;
        b = b + 2;
        do_continue = (b < 10);
    }
    gpu_while_end ( );
    res [ global_id ( )] = a;
}
```

Variables are changed to the corresponding device data type, device values are indicated by the prefix gpu_, therefore int becomes gpu_int. At the beginning and at the end of the loop body, the special functions gpu_while_begin and gpu_while_end are called, respectively.

For other flow control statements, such as if-clauses, other functions can be used instead, such as gpu_if_begin and gpu_if_end. Instead of explicitly calling these functions here, a constructor/destructor mechanism, or other language features can be used, to make the loop declaration more user friendly. However, the present invention is not restricted to any such method, and a more basic approach will be used here, for explanatory reasons, of explicitly calling the gpu_while_begin and gpu_while_end functions in the example. The result is written to the resource res, which provides memory access. Implementation of resource access is well known to a person skilled in the art, and is therefore not detailed in this document. It will be assumed that the use of the '[ ]' operator generates the appropriate instructions. The program code is accessible as some function or class. In this document, as an example, the function example_kernel( ) is used, so that it can be called from the compiler library.

The language-embedded programming technique is used. Before the kernel can run on the device, the kernel program instructions need to be generated. To do this, the kernel function is executed on the CPU. Contrary to the normal intrinsic variables, all variables declared as a device type—in this example, gpu_int and gpu_bool—will not immediately perform a computation, but the computational steps are recorded in an expression graph, which is a directed and acyclic graph. Each device variable contains a pointer to its current value in the expression graph. Whenever the device variable is assigned a new value, its pointer is changed to the new value. Nodes that are not referenced any more may be deleted. Two or more variables may point to the same node. This can happen if variables are copied, or after expressions are optimized. From this expression graph, the kernel code is generated. This can be direct machine code, or some intermediate code, such as OpenCL.

With the present invention, the following procedures can be implemented, individually or in combination:

The device variables are registered in some way, such that a computer can, at any time, access a list of all device variables that exist in the current scope. These variables are also called active variables. Most modern programming languages support the notion of scopes. Local variables are only valid within a given scope. Consider the following example:

```
1   void foo ( )       2              {
        3              gpu_float a;                4
        for ( int i =0; i <10; ++i)  5          {
            6                          gpu_float b = a+i;
    7                   a += b;                  8
        }                              9
                                  10  }
```

In the code fragment above the variables are valid in the following ranges: Variable a from line 3 to line 9, variable i from line 4 to line 7, and variable b from line 6 to line 7.

The corresponding local variables, in this example variables a, i, and b, only exist from the point where they are defined to the end of the corresponding scope. At any point during execution, a well-defined set of variables is alive. In some programming languages, a constructor is called when the variable first comes into existence, and a destructor is called when the corresponding scope is left. Variables may also be allocated on the heap, in which case the programmer can choose when to create and when to destroy them. In the present invention device variables are destroyed in the same scope in which they have been created. Otherwise, dynamic memory management would be required on the device, and the variable could not be stored in a register.

With reference to FIG. 1, a method to access the list of active variables at runtime is explained. If the programming language supports constructors and destructors, one of many options, but probably the most efficient way to implement this, is to use constructors and destructors and a doubly linked list. All device variables, store two pointers that point to the previous variable and to the next variable. Optionally a base class can be used. A root node is stored as a static variable. The root node serves as an entry point to the list. The two pointers prev and next of the root node are initialized with the root node address itself Then, when a device variable gets into scope, its constructor is called, which inserts the new variable into the list, by setting the pointers in the following way:
    this->prev=root->prev
    this->next=root
    root->prev->next=this
    root->prev=this Therein 'this' points to the new variable and 'root' to the static root node.

Figure 2:
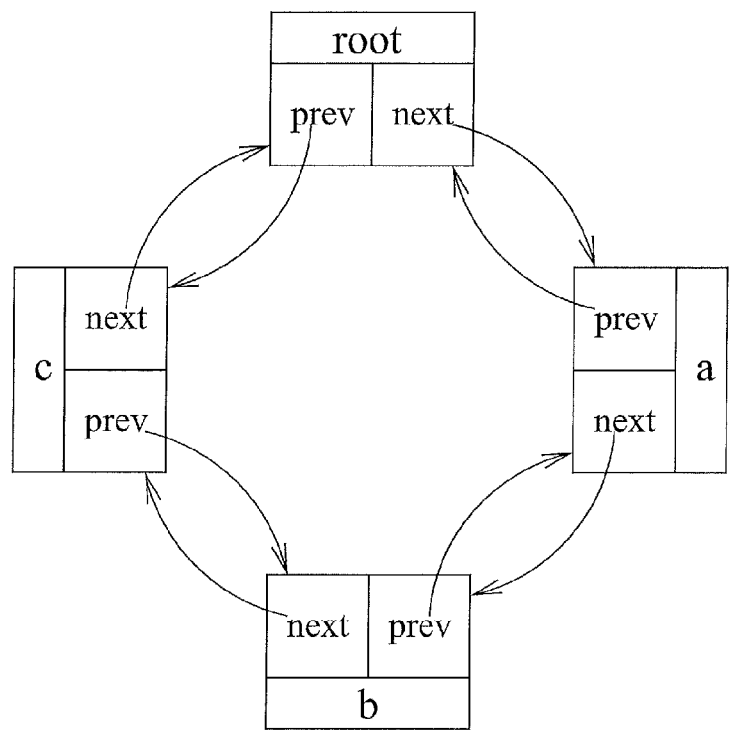
FIG. 2 is a diagram of a device variable list containing variables a, b, and c.

FIG. 2 shows the list structure with three variables a, b, and c. When a device variable gets out of scope, its destructor is called, which will remove the variable from the list, by setting the pointers as follows:
    this->prev->next=this->next
    this->next->prev=this->prev With such a list all device variables that are currently in existence can be accessed by starting at the root node and by following the next pointers until the root node is reached again. Alternatively, other methods can be used to keep track of active variables, depending on what features are supported by the programming language.

The kernel program is executed on the CPU to generate the expression graph, which later on will be used to create the kernel instructions for the device.

Figure 3:
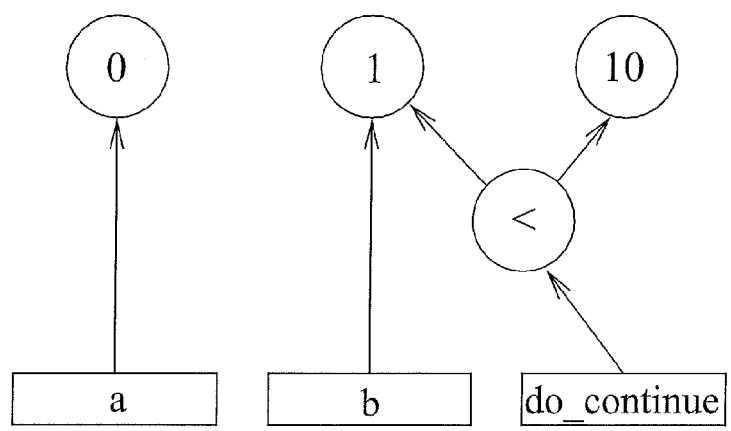
FIG. 3 is an expression graph before introducing copies of the variables.

Whenever a loop or an if-clause is encountered during the processing, the function gpu_while _begin( ) or gpu_if_begin( ), or any other function that is suitable for the flow control statement encountered, is called at the beginning of the loop body. FIG. 3 shows the expression graph of program 'example_kernel' at the beginning of the loop, when gpu_while_begin( ) is called.

This function can have one or more of the following effects:

Referring to FIG. 3, for each device variable currently in existence, its value is replaced with a copy of itself, i.e., a copy node is created and the node pointer in the variable is changed to point to the new copy node. The new copy node points to the original node. Thereby multiple variables pointing to the same expression node are separated to point to different nodes. Thus a register can be assigned to all device variables, which may otherwise not be the case for all node entries, such as constant numbers. In this way, it is guaranteed that to every device variable a unique register name can be assigned. The creation of copy nodes may not be strictly necessary for every variable, but redundant copy operations can be removed later on.

Figure 4:
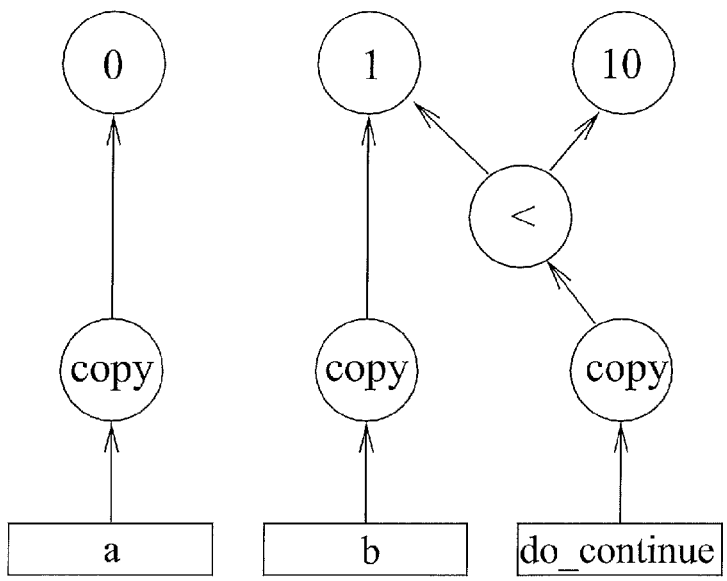
FIG. 4 is an expression graph after introducing copies of the variables.

FIG. 4 shows the expression graph after introducing the copy nodes. The boxes represent the variables and the circles represent the operations that are needed to determine their values.

For processing the expression graph of previous instructions the following is performed: The current expression graph is evaluated immediately. As detailed in FIG. 5, this will generate the kernel instructions up to the beginning of the loop and assign register names to all existing variables.

Referring to FIGS. 5 to 8, the expression graphs depicted therein contain nodes that have already been evaluated. Evaluated nodes are marked as dashed circles. Further, dashed arrows represent markings of replacement and dotted arrows represent dependencies. As a result of their evaluation, the following pseudo code is generated:

R1=0
R2=1
R3=(1<10)

Figure 5:
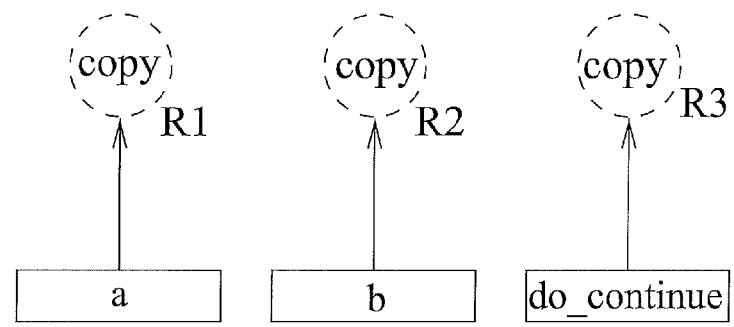
FIG. 5 is an expression graph before the loop and after evaluating the instruction nodes.

FIG. 5 shows the expression graph before the loop and after evaluating the instruction nodes. The program code above is the code generated from the instruction nodes that have already been evaluated. The three nodes that are still referenced are marked as evaluated, and have a register assigned to them.

For each device variable currently in existence, its current node pointer is stored as 'original node pointer', so that later on it can be compared with the value it has at the end of the loop body.

Figure 6:
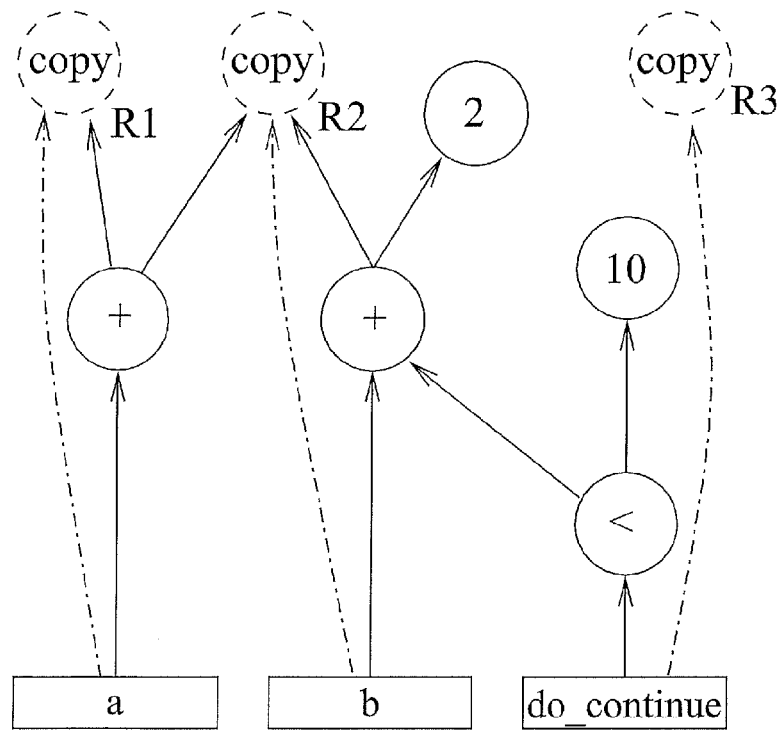
FIG. 6 is an expression graph at the end of the loop body.

The loop body is then executed, and the device data types record all steps of computation in the expression graph. The expression graph at the end of the loop body is shown in FIG. 6. The dash-dotted arrows point to the original nodes at the start of the loop body. If the loop body contains further flow control statements, such as a nested loop or an if-statement, such flow control statements are handled recursively, by applying the pertinent procedures to this nested flow control statement.

At the end of the loop body, the function gpu_while_end( ), or any other function that is suitable for the flow control statement encountered, is called.

Figure 7:
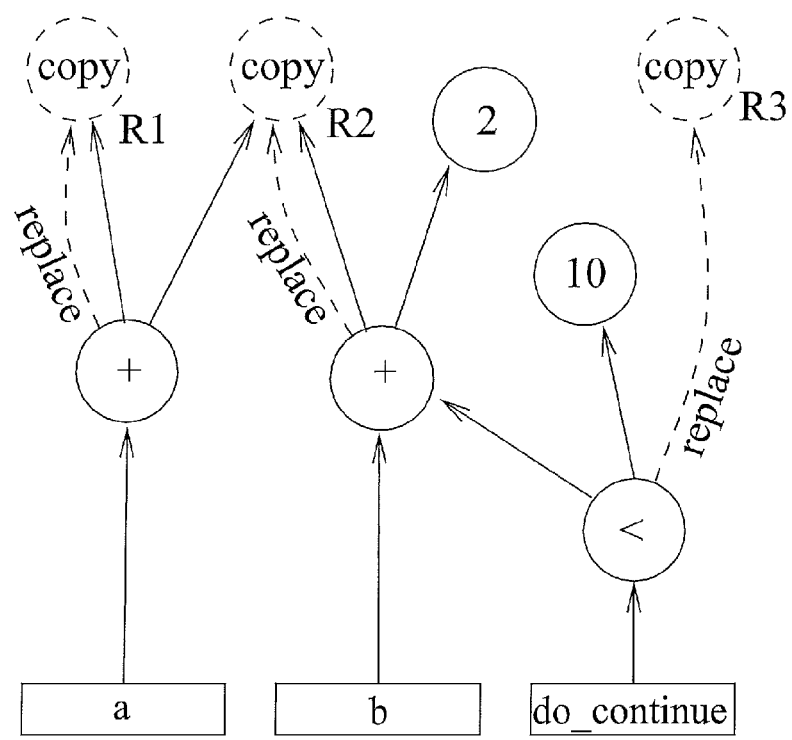
FIG. 7 is an expression graph showing replace pointers.

This function can have one or more of the following effects:

Referring to FIG. 7, for each active device variable, its current node pointer is compared to the original node pointer that has been stored before. If it has changed, the new node is marked to replace the old node. In the following description, replace pointers are added for those variables whose value has changed in the loop body. This can be implemented as an additional pointer in the device type data structure. Other means to implement the same functionality are possible, such as directly adding the appropriate dependency pointers. Because the device variables are destroyed in the same scope in which they have been created, i.e. no variable is permanently created or destroyed on the heap, the same variables exist before and after the loop body.

Figure 8:
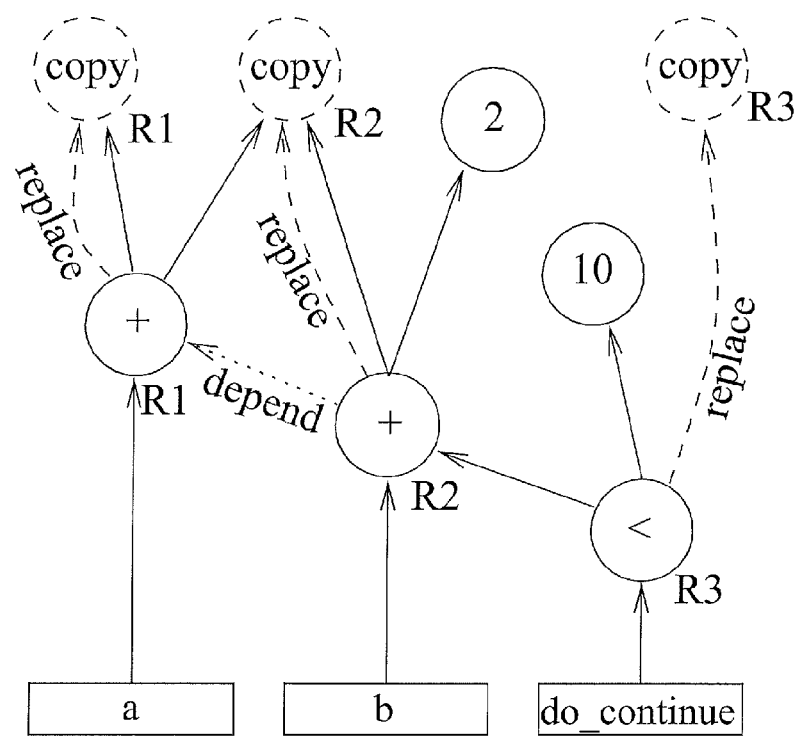
FIG. 8 is an expression graph after evaluating the effect of the replace pointers.

Referring to FIG. 8, when a register is to be assigned to a node, which is marked to replace another node, it will be given the same register name as the node that is being replaced. For all replace pointers, dependencies are added such that every node that accesses the node that is being replaced is calculated before the node that is replacing. This is necessary, because the register value is overwritten, and all nodes that use its original value must use it before it is overwritten. In FIG. 8 the registers R1, R2, and R3 are replaced. As seen in FIG. 8, because the left '+' (plus) node uses a node, in this case the central 'copy' node on top, which is replaced by another node, in this case the '+' (plus) node in the center, a dependency is added to make sure the original value of register 'R2' is used before it is overwritten.

Figure 9:
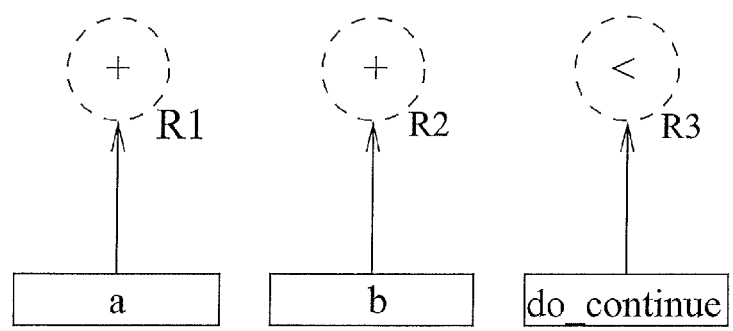
FIG. 9 is an expression graph after the loop.

Referring to FIG. 9, the expression graph is evaluated and the loop decoration, here for example the statement 'while (R3)', is added to the output code in the appropriate way, along with scope brackets or other means to indicate the loop in the output code. The program pseudo code after the loop is:

```
R1 = 0
R2 = 1
R3 = (1 < 10)
while (R3)
{
  R1 = R1 + R2
  R2 = R2 + 2
  R3 = (R2 < 10)
}
```

Figure 10:
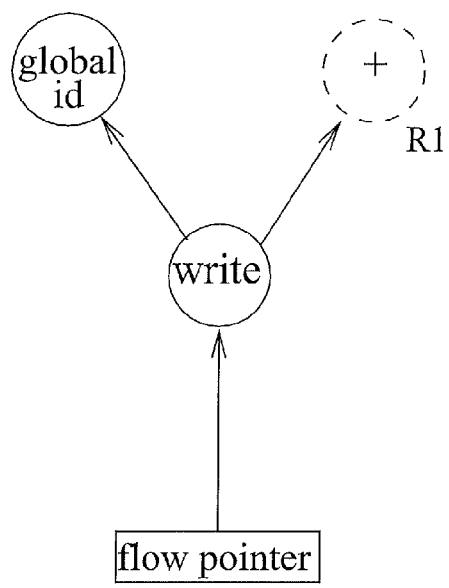
FIG. 10 is an expression graph at the end of the example kernel.

Then the rest of the kernel function is executed, and FIG. 10 shows the expression graph at the end of the example kernel. Variables a and b have gone out of scope. The write statement is still accessible through for example a 'flow pointer'. The flow pointer is used so that the write node is still referenced and not deleted.

The expression graph is turned into program instructions for the device. The final program code may be machine code, or some intermediate code. In the given example, the resulting code corresponds to the following pseudo code:

```
R1 = 0
R2 = 1
R3 = (1 < 10)
while (R3)
{
  R1 = R1 + R2
  R2 = R2 + 2
  R3 = (R2 < 10)
}
res [ global_id ] = R1
```

This code, whether it is direct code, for example machine code, or indirect code, for example OpenCL code or some other intermediary code, is ready to be executed on the device.

Figure 11:
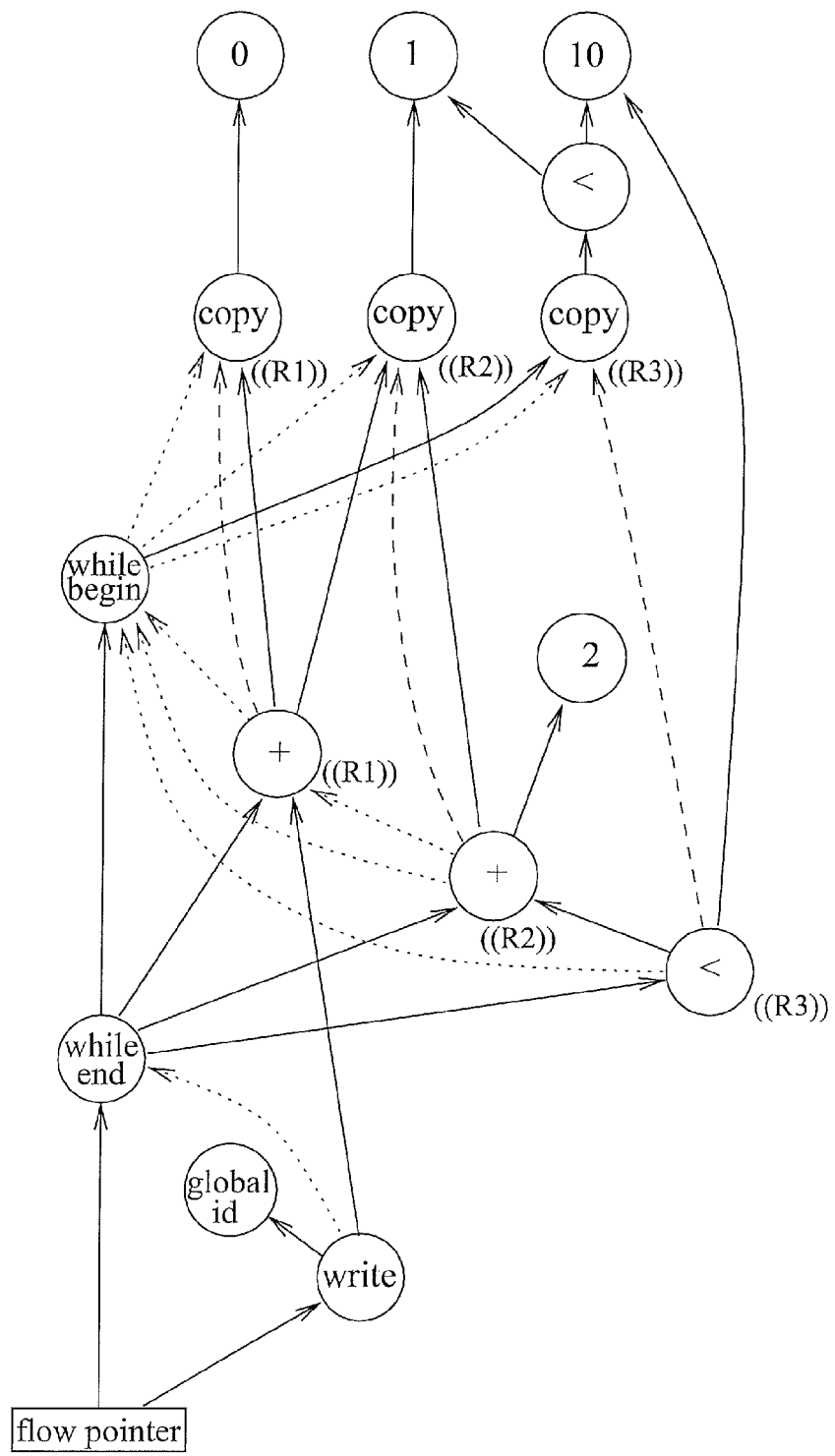
FIG. 11 is a full expression graph showing flow control statements.

Referring to FIG. 11, alternatively to the aforementioned description of processing the expression graph of previous instructions, the following can be performed: The flow control statements, each consisting of an entry node and an exit node are made part of the expression graph. Dependencies are used to enforce the correct instruction ordering. FIG. 11 shows the full expression graph containing flow control statements. Therein dashed arrows refer to replace pointers, dotted arrows refer to dependencies, and solid arrows refer to usage as input values. The registers R1, R2, and R3 are not assigned at the beginning, but are shown in the figure to indicate, which values will be assigned the same register due to the replace pointers. This procedure is similar to the procedure detailed above, but code generation is delayed. The expression graph is not evaluated until the end of the kernel function and dependencies must be used to ensure the generated code is correct.

Flow control statements must be ordered in the correct way, usually in the same order as the corresponding statements occur in the source code, or possibly slightly relaxed. This can be achieved by adding dependency pointers between the flow control nodes. Here input value pointers are used instead; they are marked as solid arrows in FIG. 11. Thereby the procedure has the additional benefit that the nodes for the flow control statements are not deleted. Nodes that are referenced by dependency pointers only and not by input value pointers may be removed from the graph.

Nodes that are replaced by other nodes need to be evaluated in the correct scope, before the entry node of the flow control statement, in which they are replaced. All nodes that use these nodes as input must be evaluated after that entry node. Nodes that are replacing other nodes must be anchored in the correct flow control scope, between the entry node and the exit node, by adding dependencies. Writes to memory must be evaluated in the correct scope. No node shall be evaluated in a sub-scope. This means that if there are recursive flow control statements, for example an if clause within a while loop, then all nodes that relate to the while loop must be evaluated either before the 'if begin' node or after the 'if end' node. Nodes may be pre-calculated in parent scopes, though, unless a dependency prevents this.

To increase performance, optimizations can be performed on the expression graph. For instance, in the example above, the '<' (smaller than) node that takes the values 1 and 10 as input is a constant expression and can be replaced by the value 'true'.

The subject-matter of this document may be implemented in a wide variety of devices or apparatuses. Aforementioned devices constitute only examples. Various examples of the invented methods have been described. These and other examples are within the scope of the following claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method of flow control in a device comprising a central processing unit and a computing device, the method being executed by a compiler that is linked as a library and running on the central processing unit, for processing of a flow control statement to adapt a data structure of a program running on the computing device, comprising the steps of:
registering a plurality of variables of the device in a variable list,
storing, for each of the plurality of variables that is currently in existence, a node pointer as original node pointer for this variable,
processing instructions contained within the flow control statement,
determining, for each of the plurality of variables that is currently in existence, whether a current node pointer is different from the original node pointer,
marking a current node of each of the plurality of variables, for which a difference to an original node has been determined, as replacement for the original node,
evaluating the data structure, which is an expression graph, and creating a code output, wherein language-specific flow control statements are added to the code output,
creating instructions for the computing device based on the data structure,
generating the expression graph by executing a program on the central processing unit and creating instructions for the computing device based on the expression graph,
turning the expression graph into program instructions for the computing device.

2. The method of claim 1, wherein each of the plurality of variables is registered from within a constructor call that constructs the variable and/or wherein each of the plurality of variables is removed from the list of variables from within a destructor call.

3. The method of claim 1, wherein evaluating the data structure comprises assigning a register name to at least one of the nodes in the data structure.

4. The method of claim 1, wherein processing instructions contained within the flow control statement further comprises recording, by device data types, all steps of computation.

5. The method of claim 1, wherein marking the current node of each of the plurality of variables, for which a difference to the original node has been determined, as replacement for the original node, further contains adding a replace pointer to the original node.

6. The method of claim 1, wherein marking the current node further comprises adding dependencies to prevent inadvertent overwriting of variables.

7. The method of claim 1, wherein output code is generated from the data structure at the beginning of every flow control statement.

8. The method of claim 1, wherein the entry and exit of a flow control statement are represented within the data structure by an entry node and an exit node, and the evaluation of the data structure is effected at the end of the processing.

9. The method of claim 8, wherein the order of the flow control statements is enforced by using dependency pointers, and/or
wherein nodes that are replaced by other nodes are evaluated before the entry node of the corresponding flow control statement, and/or
wherein nodes that use other nodes as input parameters that are replaced by other nodes are evaluated after the entry node of the corresponding flow control statement, and/or
wherein nodes that are replacing other nodes are anchored between the entry node and the exit node of the corresponding flow control statement.

10. The method of claim 8, wherein nodes can be evaluated in a parent scope, unless this is prevented by dependencies, but nodes cannot be evaluated in a sub-scope.

11. The method of claim 1, wherein optimizations are performed on the data structure before the data structure is evaluated.

12. The method of claim 1, wherein the computing device is a parallel computing device or a video card.

13. A computer program product comprising a non-transitory computer-readable storage medium storing a program for a processing device, comprising software code portions for performing the steps recited in claim 1 when the program is run on the processing device.

\* \* \* \* \*